United States Patent [19]

Suzuki et al.

[11] Patent Number: 4,742,804
[45] Date of Patent: May 10, 1988

[54] SPARK-IGNITION ENGINE

[75] Inventors: Shigeo Suzuki; Toshihiro Ozasa, both of Aichi, Japan

[73] Assignee: Kabushiki Kaisha Toyota Chuo Kenkyusho, Aichi, Japan

[21] Appl. No.: 10,991

[22] Filed: Feb. 5, 1987

[30] Foreign Application Priority Data

Feb. 5, 1986 [JP] Japan ................... 61-23166

[51] Int. Cl.⁴ ..................... F02B 19/12; F02B 19/16
[52] U.S. Cl. .................... 123/256; 123/279; 123/310; 123/661
[58] Field of Search ............ 123/256, 260, 262, 263, 123/279, 310, 661

[56] References Cited

U.S. PATENT DOCUMENTS

| | | | |
|---|---|---|---|
| 1,658,463 | 2/1928 | Rushmore | 123/310 |
| 1,894,667 | 1/1933 | Church et al. | 123/310 |
| 2,001,913 | 5/1935 | Kinnucan | 123/256 |
| 2,191,638 | 2/1940 | Adams, Jr. | 123/256 X |
| 3,924,582 | 12/1975 | Yagi et al. | 123/256 |

FOREIGN PATENT DOCUMENTS 0022007 2/1979 Japan .................... 123/256

Primary Examiner—Willis R. Wolfe
Attorney, Agent, or Firm—Oblon, Fisher, Spivak, McClelland & Maier

[57] ABSTRACT

There is disclosed a spark-ignition engine having a combustion chamber in which cavities are formed. The cavities are in communication with each other via a communication passage. Air-fuel mixture is appropriately held in the cavities. Spark plugs are disposed near the centers of the cavities to ignite the mixture at plural positions. At the top dead center, the clearance between the top surface of the piston and the lower surface of the cylinder head is made small to minimize useless space. A large squish area is provided to effectively collect the mixture in the cavities. Since the combustible mixture is always held in the vicinities of the spark plugs, stable and rapid combustion can be realized.

4 Claims, 16 Drawing Sheets

F I G. 4(A)
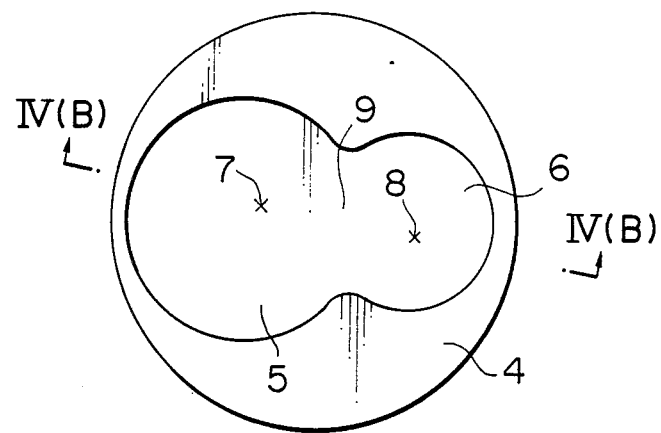
F I G. 4(B)
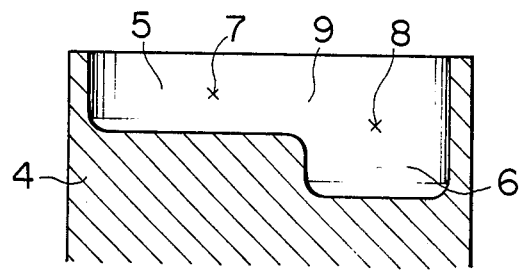

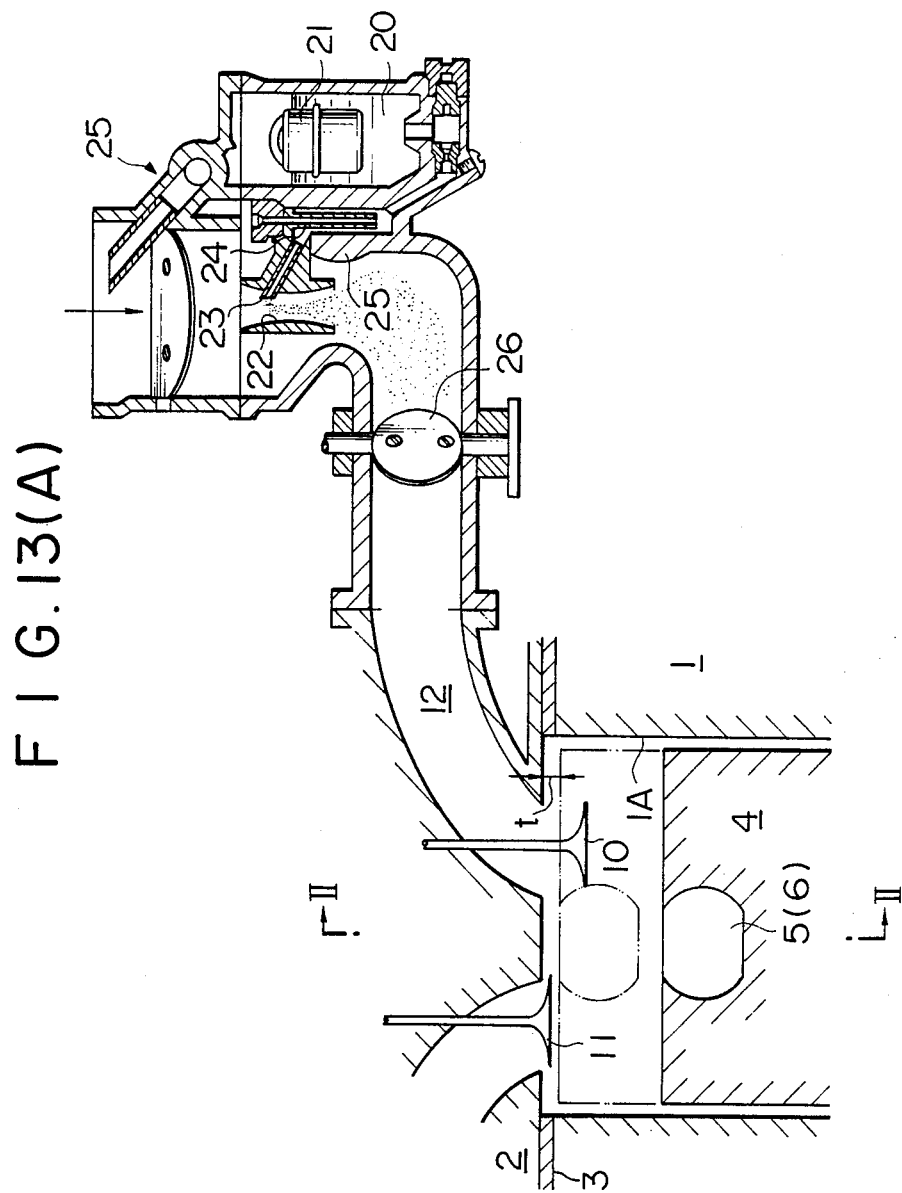

F I G. 14(A)
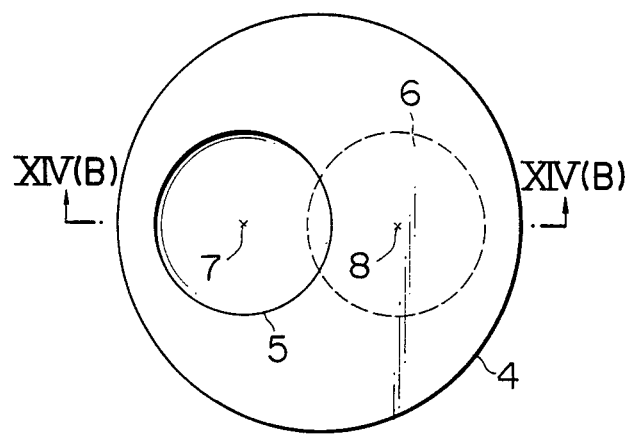
F I G. 14(B)
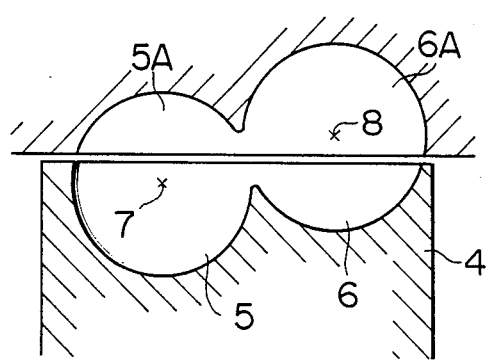

F I G. 16(A)
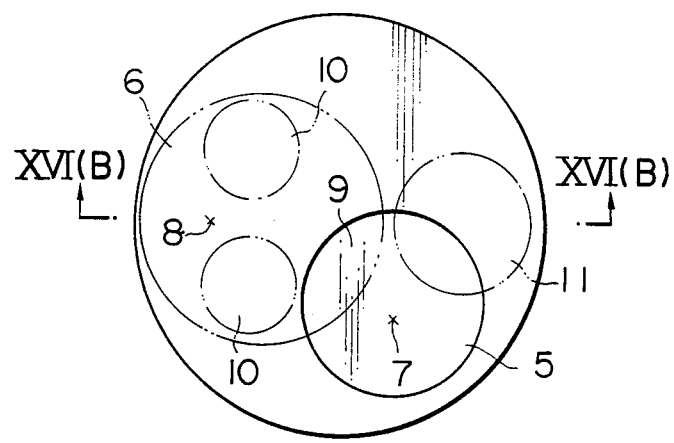
F I G. 16(B)
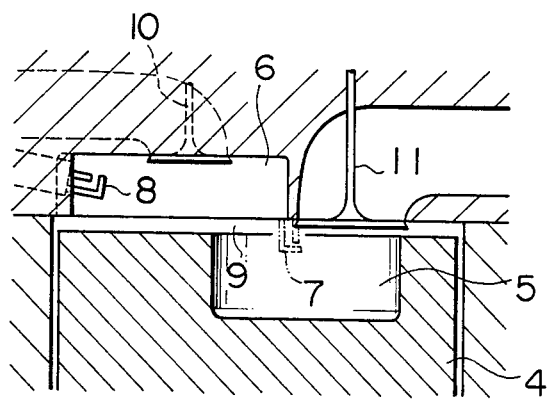

F I G. 18(A)
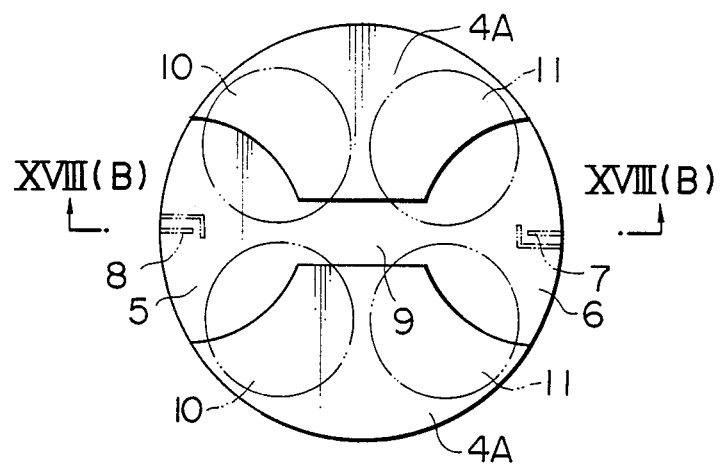
F I G. 18(B)
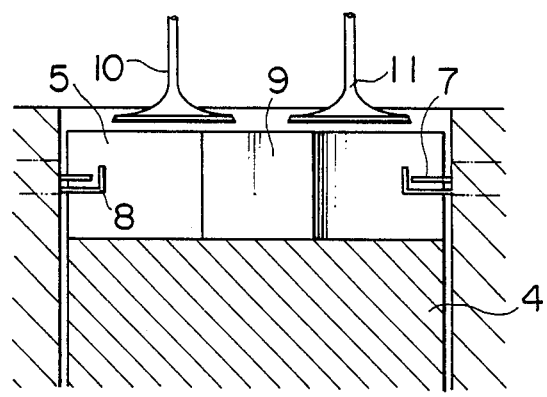

SPARK-IGNITION ENGINE

BACKGROUND OF THE INVENTION

Field of the Invention

The present invention relates to a spark-ignition engine and, more particularly, to a multi-point spark-ignition engine which has a combustion chamber provided with a plurality of cavities for holding a combustible air-fuel mixture and which further includes spark plugs disposed near the centers of the cavities to stably and rapidly burn the mixture even if it is lean.

Description of the Prior Art

It has been impossible for the prior art engine to achieve combustion of lean air-fuel mixture simply by making the supplied air-fuel mixture leaner, because combustion of the lean mixture reduces the burning velocity and renders the combustion unstable. Accordingly, various attempts have been made to stabilize the combustion. For example, the fluidity of air-fuel mixture, or the squish and swirl effects, was utilized. The distances propagated by flames were shortened by multi-point ignition (Japanese Patent Laid-Open No. 132306/1976). The compression ratio was increased to shorten the ignition delay (SAE 790386).

However, none of these attempts permitted stable operation with quite lean air-fuel mixture that reduces the $NO_x$ emission contained in the exhaust gas to a sufficiently low level. Therefore, EGR (exhaust-gas recirculation), ignition delay, or other countermeasure is needed. This has frequently made it impossible to make the best use of the features of combustion of lean mixture.

In an internal combustion engine, the theoretical thermal efficiency is given by $$\eta_{th} = 1 - (1/\epsilon)^{k-1} \qquad (1)$$

where $\epsilon$ is the compression ratio, and k is the ratio of specific heats, Cp/Cv. (Cp and Cv are the speicific heats at constant pressure and constant volume respectively). It can be understood from this equation that the theoretical thermal efficiency is improved by increasing the compression ratio or the ratio of specific heat. That is, the best result is obtained by increasing the compression ratio and allowing combustion of the lean mixture. It is to be noted that as the air-fuel mixture approaches air, the value of the ratio of specific heat k increases. Further, combustion of the lean mixture improves the antiknock property and reduces the temperature of the combustion gas, leading to reductions in heat loss and in the amount of $NO_x$ emission. These features have certain attractions, and this system has been put into practical use in present vehicles. However, this system is unable to run with such a lean mixture that can sufficiently suppress the level of the $NO_x$ emission in the whole range.

A so-called stratified combustion system differing from the premix lean combustion has been proposed. Specifically, a relatively rich air-fuel mixture that is relatively easy to ignite is supplied only in the vicinities of ignition sparks, but the inside of the cylinder is generally supplied a with a lean air-fuel mixture. Since the mixture further approaches air, a higher thermal efficiency can be attained. Further, a sufficient amount of air is supplied, greatly reducing poisonous components of the exhaust gas.

However, this stratified combustion system also has various difficulties. Specifically, it is difficult to control the air-fuel mixture. A high energy ignition svstem is necessitated. Instability in the combustion increases the THC emission in the range of low loads.

SUMMARY OF THE INVENTION

It is an object of the present invention to provide a spark-ignition engine which has a compact combustion chamber combined with multi-point ignition, uses high compression ratios to run even with an extremely lean mixture without the complex control of the air-fuel mixture, the ignition system, and so on, and yields a high thermal efficiency while sufficiently reducing the level of the $NO_x$ emission.

The spark-ignition engine according to the invention has the following structures to stably and rapidly burn lean air-fuel mixture.

According to the invention, a spark-ignition engine comprises a combustion chamber formed by a cylinder head, a piston, and a cylinder block, a suction mechanism for supplying sucked air into the combustion chamber through an intake port, fuel supply means disposed in the intake port for supplying fuel to the sucked air to form an air-fuel mixture. It comprises a plurality of ignition means for igniting the air-fuel mixture to cause combustion, and a plurality of cavities for holding the air-fuel mixture therein formed in at least the cylinder head, the piston, and the cylinder block in communication with each other through a communication passage, the cavities being so formed as to face the combustion chamber. The plurality of ignition means has ignition portions that face substantially the center of each cavity, thereby igniting the air-fuel mixture within the cavities at a plurality of at plural points.

First, the combustion chamber has small cavities which are in communication with each other through a passage. A spark plug is disposed near the center of each cavity to shorten and make uniform the distances propagated by the flames.

Secondly, at the top dead center, the clearance between the top surface of the piston and the lower surface of the head is minimized, and the squish area is made large to minimize the useless volume and to collect air-fuel mixture uniformly into the cavities. Further, a combustible air-fuel mixture is maintained in the vicinities of the spark plugs.

Thirdly, high compression ratios are employed to shorten the ignition delay and to assure stable ignition. Also, rapid and stable combustion is ensured.

Furthermore, the novel engine can run even at extremely lean air-fuel ratios, although it does not differ from the conventional premix engine in components, cost, or ease with which the engine is handled. Additionally, the exhaustion level of $NO_x$ can be sufficiently reduced while the thermal efficiency is enhanced.

The spark-ignition engine according to the invention essentially relies upon these three points, and permits stable and rapid combustion of an extremely lean air-fuel mixture at a high compression ratio, which has heretofore been impossible to achieve with conventional premix engines. Therefore, a high thermal efficiency can be realized while retaining the $NO_x$ and total hydrocarbon (THC) emissions at sufficiently low levels. In addition, neither an extra mechanism nor a control is required, as compared with the conventional premix engine as mentioned above. Hence, the invention can be practiced at a very low cost.

In the spark-ignition engine according to the invention, the air-fuel mixture metered by a fuel supply means is held in the cavities formed in the cylinder. The mixture is ignited by the spark plugs disposed near the centers of the cavities. At the top dead center, the clearance between the top surface of the piston and the lower surface of the head is made small to minimize the useless volume, but the squish area is large. Therefore, the mixture is effectively collected in the cavities and retained in the vicinities of the spark plugs. This allows stable and rapid combustion.

More specifically, air and fuel are mixed in the combustion chamber during the compression stroke. Near the top dead center, the relatively broad squish area including the top end surface of the piston creates squish flows. Complex flow due to the interaction of squish flows promotes mixture of air and fuel in the cavities. This turbulent flow is much stronger than the swirl flow of suction gas conventionally created and introduced into the combustion chamber. Hence, the combustion is greatly accelerated. Since the combustion chamber comprises a plurality of cavities, the volume of each single cavity is small. Thus, it is less likely that a flow directed in one rotational direction exists in the cavities. This flow in one rotational direction corresponds to the main flow due to the conventional swirl originated at the suction stroke. Squish flows directed in various directions act on each other, creating a number of eddies. When a main flow such as swirl exists at spark timing, the initial flame produced near each spark plug is extinguished. In the novel spark-ignition engine, however, such an undesirable phenomenon does not take place, thus assuring stable ignition. In the present invention, when suction ports, such as helical port or tangential port, are used to create swirl flow of suction gas, squish flows combine with swirl flows near top dead center, thus creating turbulent flow with greater efficiency without having a main flow.

The communication passage which interconnects the cavities is now described. Generally, it is unlikely that the distribution of air-fuel mixture within the combustion chamber and the intensity of the turbulent flow are completely uniform. Rather, it is reasonable to consider that they exhibit some distributions. Therefore, if the cavities were completely isolated from each other, the distribution of air-fuel mixture and the intensity of turbulent flow would differ between the cavities, making the combustion nonuniform. In the present invention, the cavities are in communication with each other through a communication passage. Multi-point ignitions by the spark plugs cause combustion in some cavities prior to the other cavities. The flames in the first burn cavities propagate to the other slow burn cavities, thus promoting combustion. This communication passage is also effective in using the expansion of burned gas within each cavity as the energy to create turbulent flow. The combustion is promoted as compared with the case where cavities are isolated. Accordingly, in order to create turbulent flow, it is desired that the communication passage, especially its opening, preferably is narrow. However, in order to reduce the nonhomogeneity in combustion, the opening of the passage preferably is wide. That is, the dimensions of the passage between the cavities are preferably determined in view of requirements of the whole engine system.

Other objects and features of the invention will appear in the course of the description thereof which follows.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

BRIEF DESCRIPTION OF THE DRAWINGS

FIGS. 4(A) and 4(B) are diagrams of modifications of the engine shown in FIGS. 1-3;

FIGS. 12(A), 13(B), 14(A)-19(A) are plan views of other engines according to the invention;

FIGS. 12(B), 13(C), 14(B)-19(B) are cross-sectional views of the engines shown in FIGS. 12(A), 13(B), 14(A)-19(A); and FIG. 13(A) is a cross-sectional view of an internal combustion engine according to the modified example of the present invention.

DESCRIPTION OF THE PREFERRED EMBODIMENTS

Figure 1:
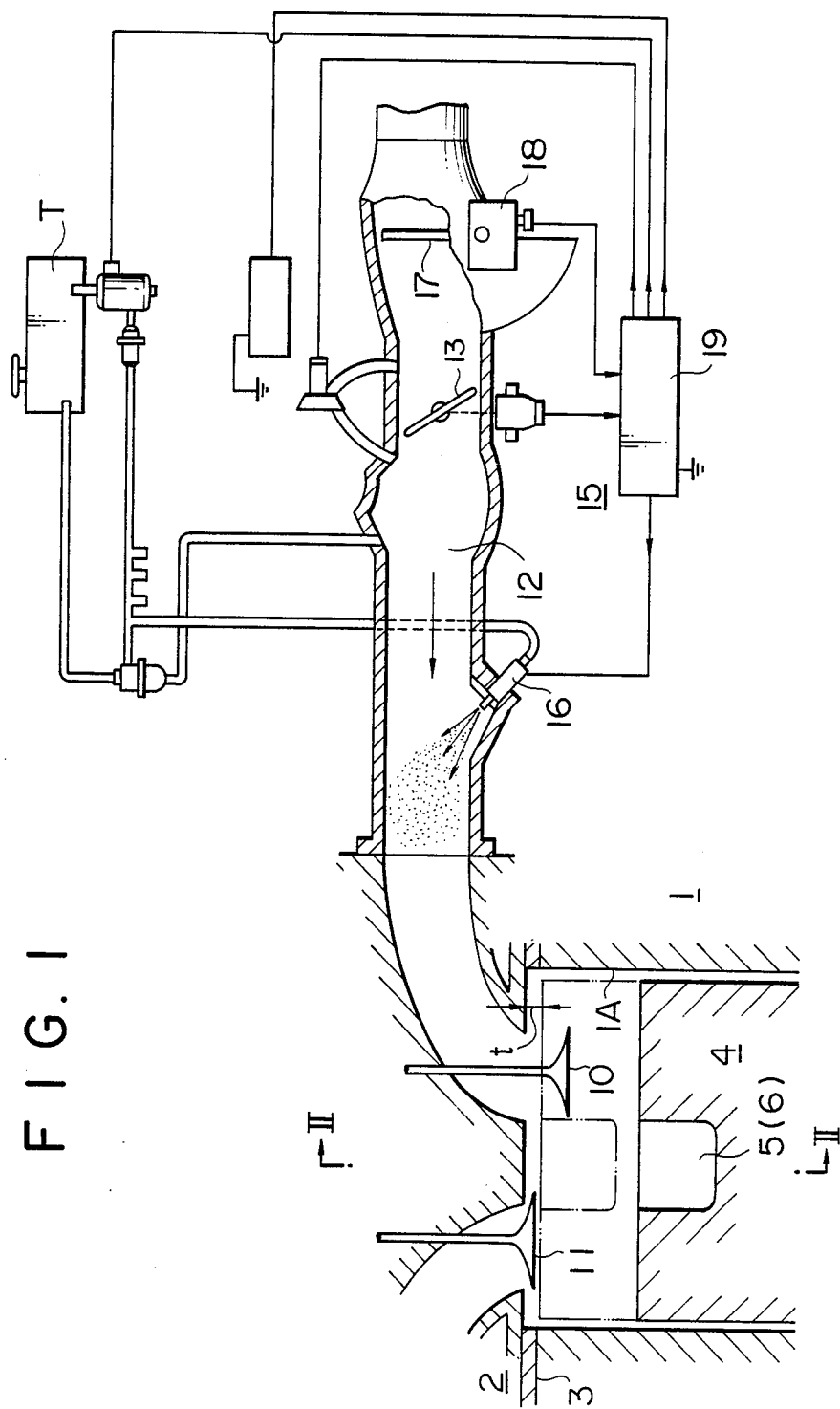
FIG. 1 is a cross-sectional view of an internal combustion engine according to the present invention.
Figure 2:
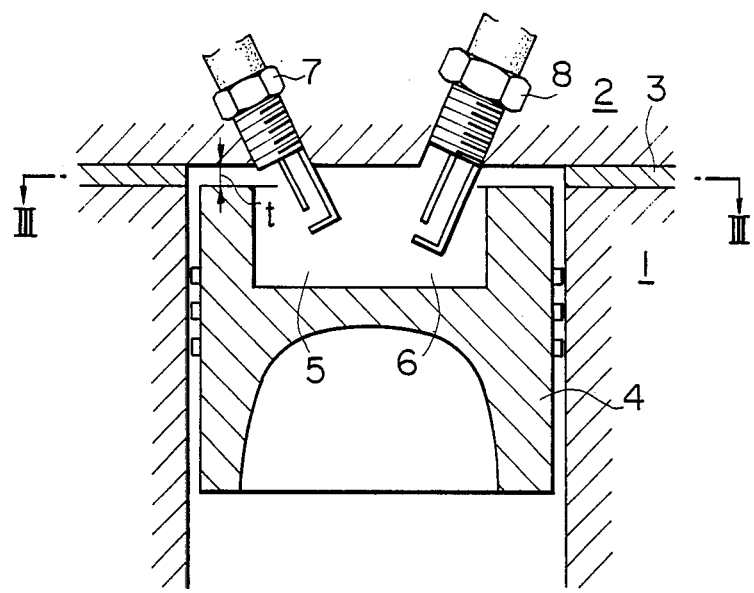
FIG. 2 is a cross-sectional view taken on line II—II of FIG. 1.
Figure 3:
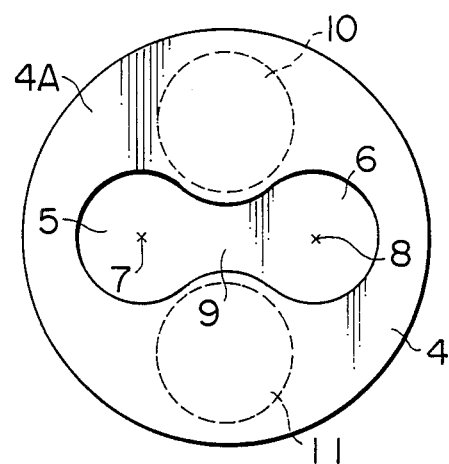
FIG. 3 is a cross-sectional view taken on line III—III of FIG. 2.

Referring to FIGS. 1-3, there is shown the combustion chamber of a spark-ignition engine according to the invention. The chamber has a cylinder 1 to which a cylinder head 2 is rigidly mounted via gasket 3. The cylinder 1 has a bore 1A in which a piston 4 moves up and down. The piston 4 has cavities 5 and 6 in its top surface. As can be seen from FIG. 3, the cavities 5 and 6 assume the same cylindrical shape, and are in communication with each other via a passage 9. The cavities 5, 6 and the passage 9 have the same depth. The space surrounded by the bottom surface of the cylinder head 2, the top surface of the bore 1A, and the top surface of the piston 4 constitutes the combustion chamber, together with the cavities 5 and 6. Spark plugs 7 and 8 projecting from the cylinder head 2 are disposed substantially at the centers of the cavities 5 and 6, respectively.

A suction valve 10 and an exhaust valve 11 are disposed on the bottom surface of the cylinder head 2. As shown in FIG. 1, the suction valve 10 is connected to a throttle valve 13, a fuel supply means, and an air cleaner (not shown) via an intake port 12. A fuel injection device 15 is an air flow detecting type electronic fuel injection device. The injection device 15 comprises a fuel injector 16 generally constituted with solenoid valve for injecting gasoline from obliquely below the intake port 12 toward the inner wall of the port 12, an airflow meter 18 for detecting the flow of air passing through the port 12 as the angular displacement of a metering plate 17, and a control unit 19 for delivering a signal to the fuel injector 16 to control the amount of injected gasoline ever time according to the signal from the airflow meter 18, taking ignition signals and the temperature of water cooling the engine into account, and in accordance with the running conditions of the engine. The gasoline is supplied to the fuel injector 16 form a fuel tank T.

It is desired that at the top dead center, the clearance t between the top surface of the piston 4 and the bottom surface of the cylinder head 2 be minimized. In this example, the clearance is set to 0.5 mm. In order to prevent the intake valve 10 or the exhaust valve 11 from interfering with the top surface of the piston 4 at the suction top dead center, the lower ends of the valves 10 and 11 may extend into the cylinder head 2.

A squish area 4A is defined between the top surface of the piston 4 and the cylinder head 2. It is desired that this squish area 4A have a large area and act to produce squish flow near the top dead center. This flow mixes the supplied air and fuel, directs the mixture uniformly into the cavities 5 and 6, and prevents the possibility that some of the mixture escapes out of the cavities 5 and 6, is quenched, and is discharged as an unburned component.

In the present example constructed as described above, when the piston 4 moves us during compression stroke, the air-fuel mixture supplied from the intake port 12 is rapidly pressed in the cavities 5 and 6 by the squish flow created by the compression which is done by the squish area 4A. This mixture can be stably held around the spark plugs 7 and 8. Also, the mixture inside the cavities 5 and 6 is stirred by the squish flow and the homogeneized mixture is retained in them, because the cavities 5 and 6 are in communication with each other through the passage 9. For these reasons, uniform combustion takes place within the cavities 5 and 6. Further, the ignited mixture flows at a high speed because of the strong squish flow. It is unlikely that unburned gas or end gas remains in one of the cavities. Hence, raoid combustion takes place, and knocking can be prevented. Also, a reduction in the poisonous exhaust components is permitted.

As described above, the plural cavities which are in communication with each other via the passage are formed. Thus, homogeneous air-fuel mixture can be mixture uniformly held in the cavities. Further, the spark plugs disposed in the centers of the cavities ensures stable and rapid combustion. Consequently, the engine can run with a leaner air-fuel mixture than heretofore. Further, the use of this leaner mixture prevents knocking, permitting higher compression ratios. These features are combined to thereby reduce the poisonous exhaust components, including $NO_x$, CO, and THC. Furthermore, a great improvement in the thermal efficiency can be attained In the above example, the cavities are similar in shape. Sometimes, the combustion may become different between the cavities, because of the design of the whole engine system. In such cases, as shown in FIG. 4 (A), (B), the shape of the cavities 5 and 6 may be designed to differ from each other in depth, cross sectional area, and volume. Alternatively the spark plugs 7 and 8 may be disposed slightly off the centers of the cavities 5 and 6, respectively, to make the best adjustment.

Figure 5:
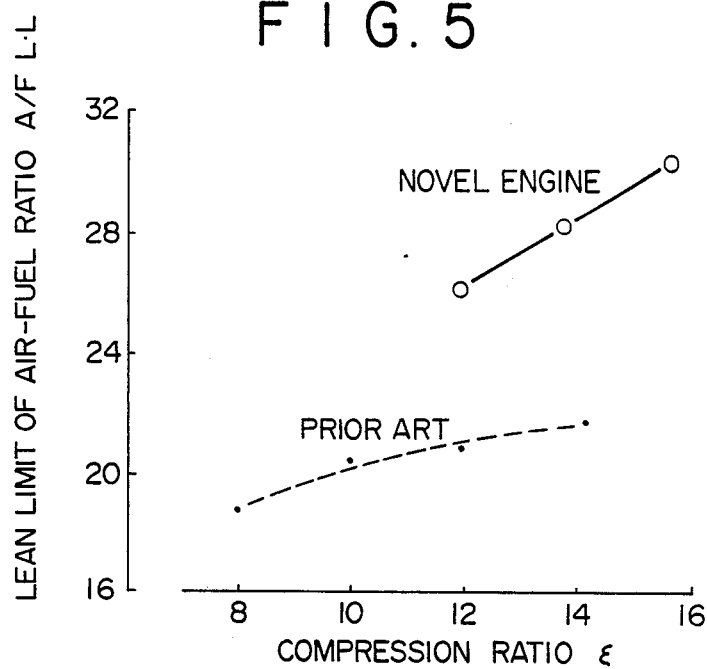
FIG. 5 is a graph in which the lean limit of air-fuel ratio due to higher compression ratios is plotted against the compression ratio.

Experiments were conducted using a gasoline having a research octane number of 91 as the fuel. FIG. 5 illustrates the relation between the lean limit of the air-fuel ratio and compression ratio. The experiments wer made using the combustion chamber constructed as described above, as well as by using the prior art combustion chamber. As can be seen from the graph, in the novel combustion chamber, when the compression ratio $\epsilon=12.0$, the lean limit of the air-fuel ratio $A/F_{LL}=26$ (the excess air ratio $\lambda=1.81$). When $\epsilon=13.8$, $A/F_{LL}=28$ ($\lambda=1.94$). When $\epsilon=15.6$, $A/F_{LL}=30$ ($\lambda=2.01$). In this way, great improvements were made over the prior art combustion chamber. In these experiments, spark plugs were disposed in their respective cavities. Also, experiments were performed in which a spark plug was placed only in one of the cavities. In this case, the lean limit of the mixture was narrower by 1 to 2 degrees. The combustion was also unstable, degrading the exhaust performance. Therefore, better results can be obtained by disposing a spark plug in every cavity in such a way that the distances propagated by the flames are shortened and made equal.

Figure 6:
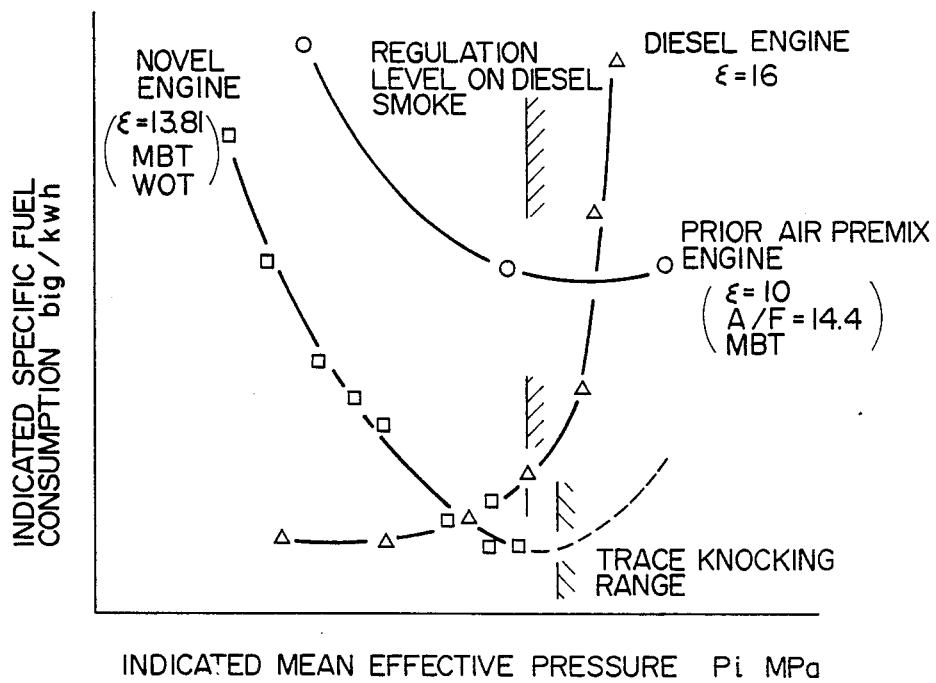
FIG. 6 is a graph in which indicated specific fuel consumption is plotted against indicated mean effective pressure, for comparing the indicated specific $NO_x$ emission.

Referring next to FIG. 6, the indicated specific fuel consumption $b_i$ obtained according to the present example, the indicated specific fuel cosumption $bi_j$ obtained by a conventional premix engine that is run at $A/F=14.4$ or $\lambda=1$, and the indicated specific fuel consumption $b_i$ derived by a Diesel engine are plotted against the indicated mean effective pressure $P_i$MPa. This graph shows that the novel engine is much superior in specific fuel consumption to the conventional premix engine over a broad load range. At the minimum specific fuel consumption, the novel engine is comparable in specific fuel consumption with the Diesel engine.

Figure 7:
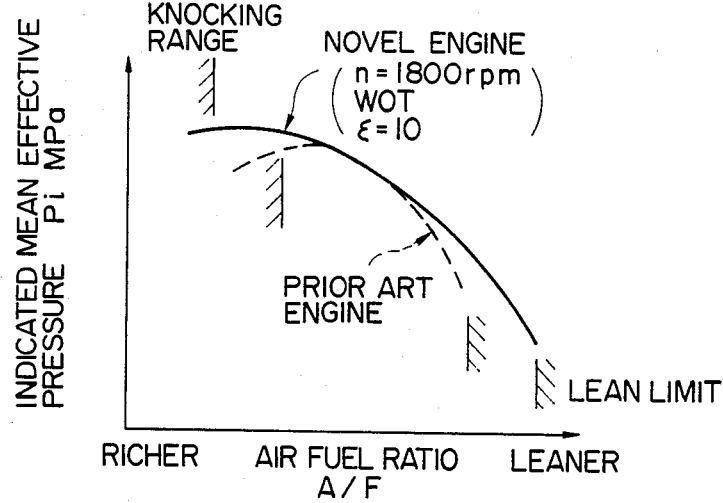
FIG. 7 is a graph in which $P_i MP_a$ is plotted against air-fuel ratio, for comparing the novel engine with the conventional engine with respect to knocking range and the air-fuel ratio at the lean limit of the mixture.

FIG. 7 compares the novel engine shown in FIGS. 1–3 with a conventional engine using the same compression ratio as the novel engine, with respect to knocking range and the lean limit of the air-fuel ratio. As can be seen from this graph, the novel engine has extended the lean limit. Further, it can more effectively suppress abnormal combustion such as knocking at high loads.

Figure 8:
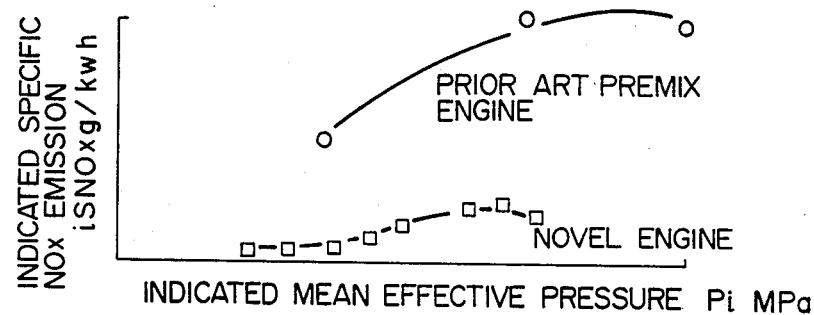
FIG. 8 is a graph in which indicated specific $NO_x$ emission is plotted against indicated mean effective pressure, for comparing the novel engine with the conventional engine.

FIG. 8 shows the indicated specific $NO_x$ emission of the novel engine and the indicated specific $NO_x$ emission of aprior art premix engine. It can be understood from this graph that the exhaust erission of the novel engine is much superior to that of the prior art engine, because combustion of a leaner mixture is realized.

Figure 9:
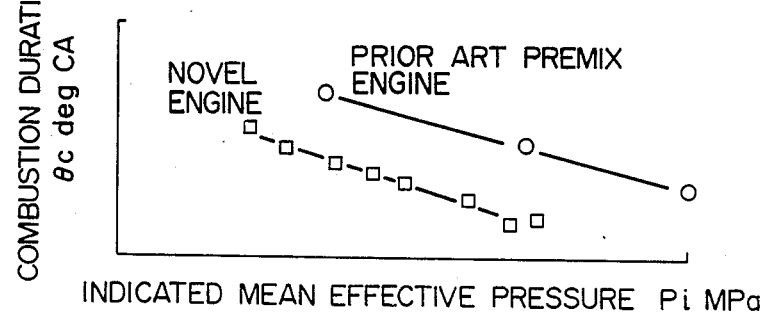
FIG. 9 is a graph in which the combustion duration is plotted against indicated mean effective pressure, for comparing the novel engine with the conventional engine.

FIG. 9 shows the combustion duration of the novel engine and the combustion duration of a conventional premix engine. This graph demonstrates that a more rapid combustion occurs within the novel engine than the conventional engine.

In this way, the novel combustion chamber allows stable and rapid combustion, although the cost and the easiness with which the engine is controlled are the same as the prior art engine. Therefore, the best use is made of the features of a high compression ratio and combustion of leaner mixture.

In the example already described in connection with FIGS. 1-3, gasoline is used as the fuel. However, the present invention is not limited to the usage of gasoline. Alcohol, kerosene, mixture thereof, methane, propane, or other gaseous fuel may be employed with similar utility.

Another spark-ignition engine according to the invention uses methyl alcohol as fuel. This engine has the same combustion chamber and yields the same advantages as the engine described first. The differences are only the ignition timing and the adjustment of the air-fuel ratio. Accordingly, the description of the shape and the arrangement of the combustion chamber is omitted; only the results of experiments are described below.

As already shown in FIG. 5, the novel combustion chamber greatly extends the lean limit of the air-fuel ratio $A/F_{LL}$ as compared with the conventional premix engine at higher compression ratios. Where gasoline was used as fuel, the excess air ratio $\lambda$ could be increased up to 2.01 under the condition of $\epsilon=15.6$. Where methyl alcohol was employed as fuel, stable running could be achieved up to $\lambda=2.75$. This is a noticeable improvement.

Figure 10A:
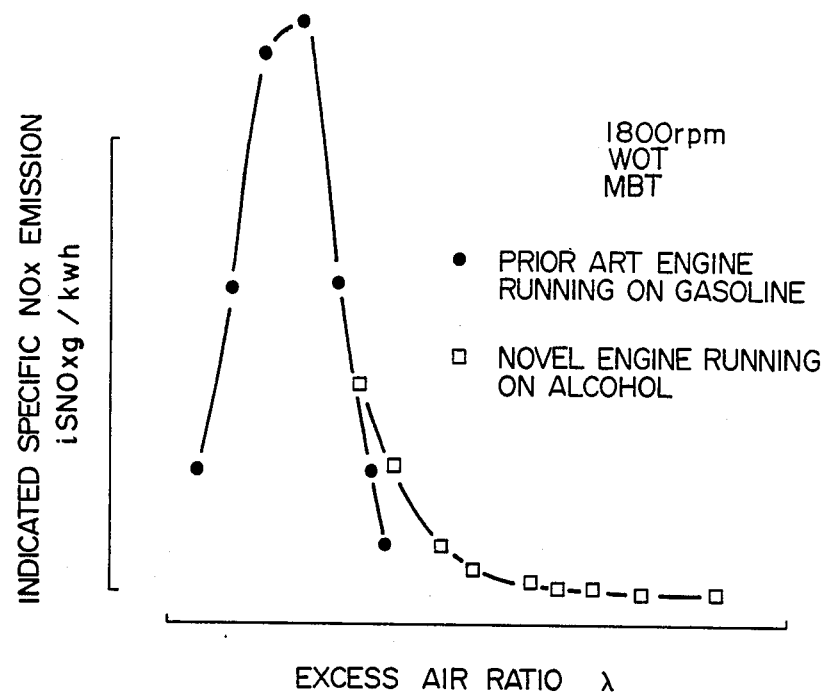
FIGS. 10(A) and 10(B) are graphs for illustrating the reduction in the amount of $NO_x$ and the improvement in the thermal efficiency realized by the use of an alcoholic fuel.
Figure 10B:
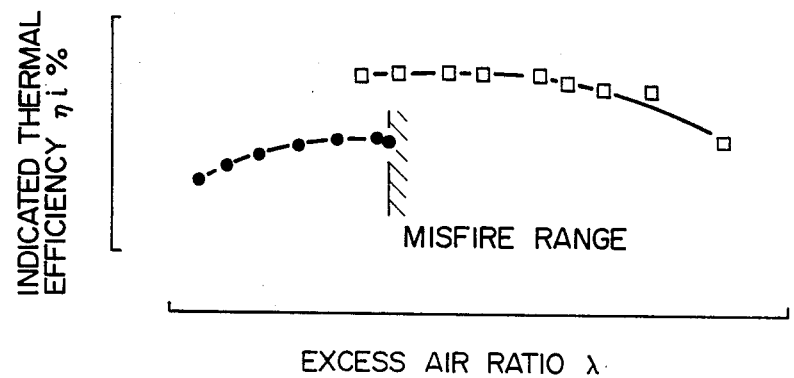
Figure 11A:
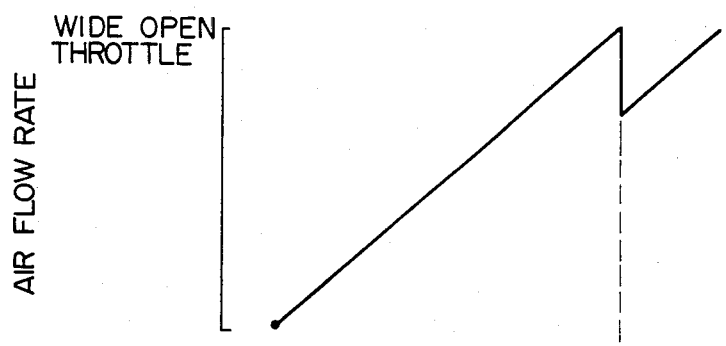
FIGS. 11(A), 11(B), 11(C), 11(D) are graphs in which the air flow rate, the fuel flow rate, the air-fuel ratio, and the compression ratio are respectively plotted against the load, for illustrating the manner in which these amounts are controlled.
Figure 11B:
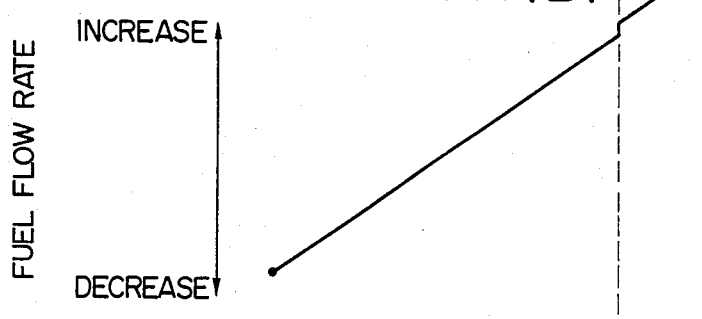
Figure 11C:
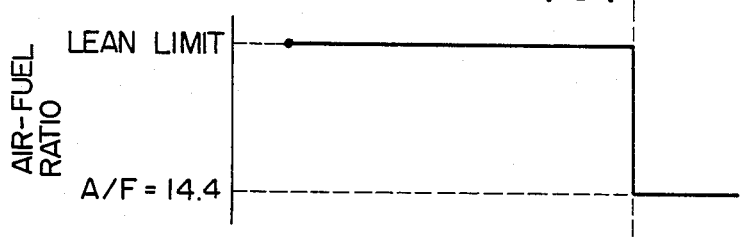
Figure 11D:
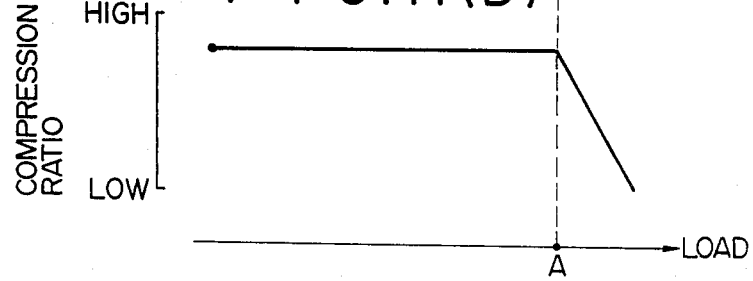

Using alcohol as fuel increases the octane rating and produces a larger latent heat of evaporation. Under these conditions, even if a high compression ratio is used, an excellent antiknocking quality can be obtained. Therefore, a leaner combustion is made possible as compared with the case using gasoline. This is proved by the fact that the excess air ratio $\lambda$ derived by using gasoline was 2.01, whereas the excess air ratio $\lambda$ provided through the use of alcohol was 2.75. Furthermore, high antiknocking quality results at even higher compression ratios. Consequently, the present invention can make the best use of the features of combustion of lean mixture at higher compression ratios. Thus, the amount of the discharged poisonous components can be greatly reduced, while the thermal efficiency can be greatly improved. FIG. 10(A) shows the indicated specific $NO_x$ emission of the present example using methyl alcohol as the fuel, in comparison with that of conventional premix engine. FIG. 10(B) shows the indicated thermal efficiency of the present example in comparison with that of the conventional engine.

A further spark-ignition engine according to the invention is now described. This engine uses a gasoline having a research octane number of 91. As already described, the present invention can effectively prevent knocking as long as the same compression ratio is used. In the example described first in connection with FIGS. 1-3, the maximum load of the MBT running using high compression ratios are limited by abnormal combustion such as knocking, as shown in FIG. 6. As can be seen from FIG. 6, the MBT running region drops to a level that is approximately 80% of the maximum output of the conventional premix engine, and is almost as low as the output of the Diesel engine. In order to overcome this limitation, this example uses a combination of compression ratio-varying devices and permits operation up to a still higher load, in addition to the good performance in the low and medium load ranges covered by the example described first.

In the example described first in connection with FIGS. 1-3, the load range at which the engine can run without causing knocking when the throttle valve is fully open is from $A/F=22$ when $\epsilon=15.6$, $A/F=20$ when $\epsilon=13.8$, and $A/F=18$ when $\epsilon=12$, to the lean limit of the air-fuel ratios at each compression ratio. Note that the air-fuel ratio $A/F$ is the load because of WOT(wide open throttle). Thus, in the present example, the opening of the throttle valve of the engine and the air-fuel ratio are controlled as shown in FIGS. 11(A)-11(D), for example, whereby the engine can stably and run well from a low load to a high load.

More specifically, the throttle valve is gradually opened while the air-fuel ratio is maintained at the lean limit at low and middle loads to permit combustion at high compression ratios and with a lean mixture. Where the load is less than A, i.e., the load is high and combustion at high compression ratios is difficult to maintain because of occurrence of knocking, an apparatus (not shown) for varying the compression ratio is operated to lower the compression ratio, for making the engine run at the theoretical air-fuel ratio while suppressing knocking. In this way, a high output can be obtained. The amount of the poisonous exhaust components is reduced by the use of three-way catalytic converter. By running the engine in this way, the amount of the poisonous exhaust components is reduced while the thermal efficiency is improved over the whole running range. Further, a good output performance is assured. Obviously, this scheme can be applied with suitable adjustments to cases where fuels having different octane ratings are used, such as alcohol, kerosene, mixture thereof, methane, propane, or other gaseous fuel. Modifications of the present invention are described below.

Figure 12A:
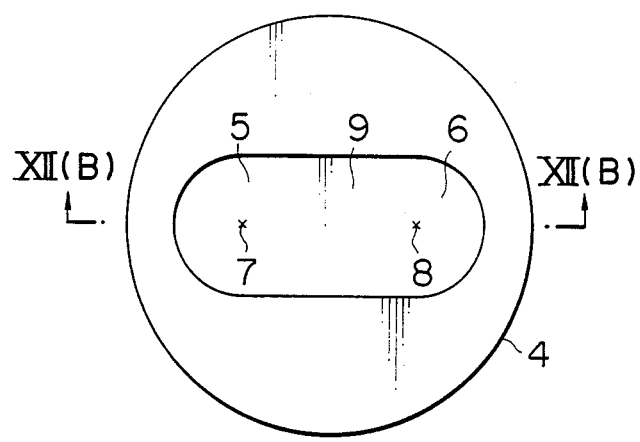
Figure 12B:
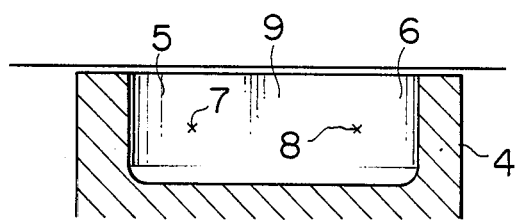

Referring to FIGS. 12(A) and 12(B), cavities 5 and 6 of a given depth are formed in the top portion of the pison 4 in a manner to be arranged along the direction of the cylinder diameter. (This arrangement of cavities is applied to FIGS. 12(A)-19(B) except for FIGS. 17(A) and 17(B).) The cavities 5 and 6 are in communication with each other via a passage 9. The passage 9 has the same width as the cavities 5 and 6. The bottoms of the cavities 5, 6 and the bottom of the passage 9 are made flat to accelerate the mixing of the air and the fuel supplied into the cavities. Indicated by x are the positions at which the mixture is ignited.

Figure 13B:
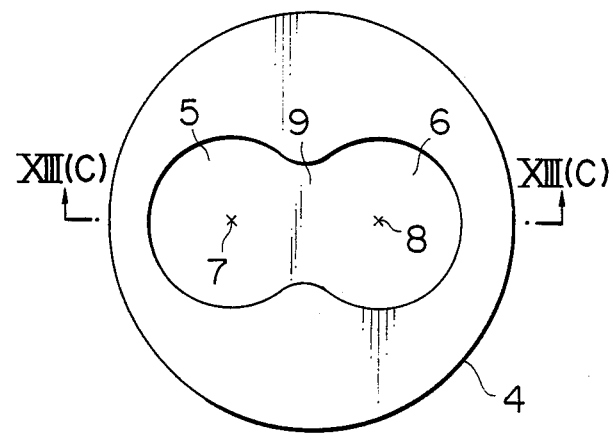
Figure 13C:
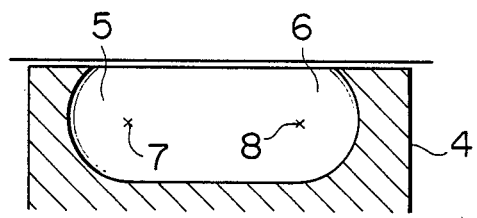

Referring to FIGS. 13(A)-13(C), cavities 5 and 6 of a given depth are formed in the top portion of the piston 4. The cross section of each cavity is narrowed toward the upper opening to form a reentrant cavity and to increase the squish area. Thus, the fuel-air mixture does not easily leak out of the cavities. The fuel supply means of the internal combustion engine of this modified example is shown in FIG. 13(A). In particular, a float chamber 20 is disposed on the upstream side of an intake port 12. A float 21 is disposed inside the chamber 20. A carburetor 25 having an air bleed 24 connected with the float chamber 20 is also disposed on the upstream side of the intake port 12. A venturi 22 is formed in the carburetor 25, and a nozzle 23 opens into the venturi 22. A throttle valve 26 interlocking with the accelerator pedal is disposed on the downstream side of the venturi 22 and on the downstream side of the curved portion of the intake port 12.

Referring to FIGS. 14(A) and 14(B), cavities 5 and 6 are formed in a cylinder head 2 and in piston 4 so as to communicate with each other. The recesses are so disposed that they form a sphere. Spark plugs are disposed in the vicinities of the centers of the recesses as indicated by x. Thus, the distances propagated by the flames are short and made equal. Further, the specific surface area is small. Consequently, the heat loss is small.

Figure 15A:
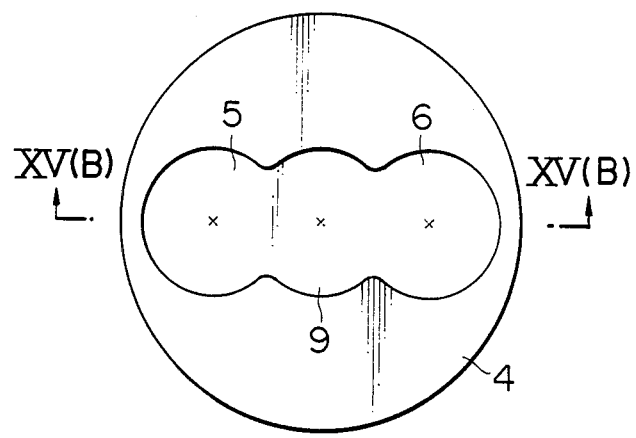
Figure 15B:
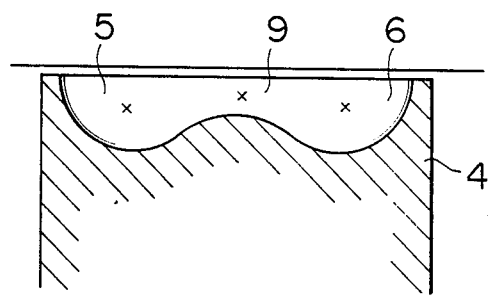

Referring to FIGS. 15(A) and 15(B), cavities 5 and 6 are in communication with each other via a passage 9 which is identical in width with the cavities 5 and 6. The passage 9 is shallower than the cavities 5 and 6. Spark plugs are disposed in the cavities 5 and 6. In addition, another spark plug is disposed near the center of the passage as indicated by x. Each air-fuel mixture held in the cavities and the passage is ignited by each spark plug to achieve stable and rapid combustion.

Referring to FIGS. 16(A)–16(B), cavities 5 and 6 are formed in the top portion of the piston 4 and in the bottom portion of the cylinder head 2 respectively such that the centers of the cavities are located off the center of the top surface of the piston. Two intake valves 10 mounted in the cylinder head 2 are disposed in the cavity 6. As the piston 4 is raised, the cavity 5 faces, and communicates with, the cavity 6. An exhaust valve 11 is disposed in the squish area. The cavities 5 and 6 are formed around spark plugs 7 and 8, respectively, so that the distances propagated by flames are substantially equal.

Figure 17A:
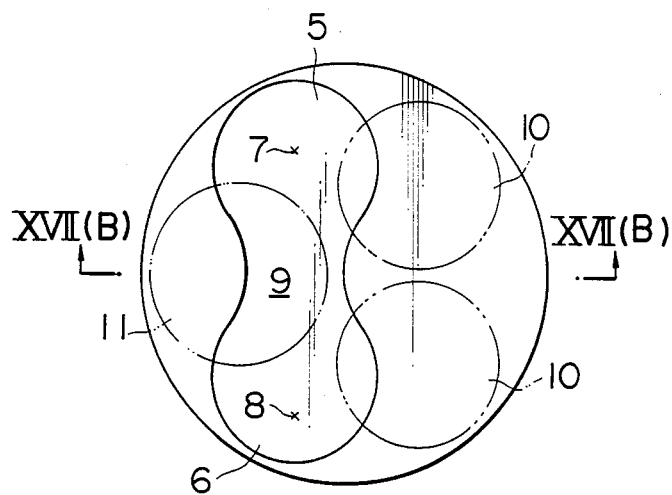
Figure 17B:
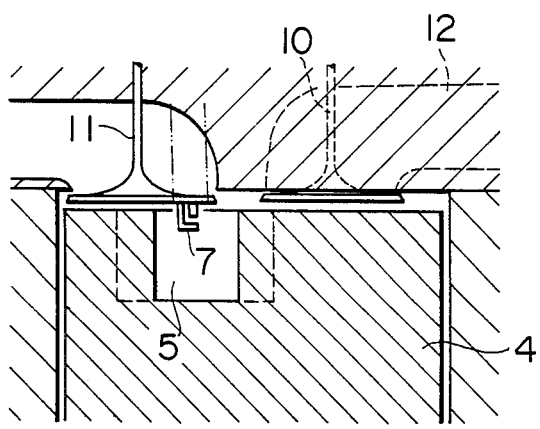

Referring to Figs. 17(A) and 17(B), cavities 5 and 6 are arranged in a manner to be offset relative to the direction of the cylinder diameter, and are located on the side of an exhaust valve 11 to prevent suction valves 10, the exhaust valve 11, and spark plugs 7 and 8 from interfering each other.

Referring to FIGS. 18(A) and 18(B), a cylinder head 2 has a substantially flat underside on which two intake valves 10 and two exhaust valves 11 are disposed. The upper surface of a piston 4 is made parallel to the underside of the head 2. Cavities 5 and 6 which are in communication with each other via a passage 9 are formed in a piston 4, while a squish area 4A is ensured. Spark plugs 7 and 8 project from one side of a cylinder block 1 into the combustion chamber to prevent them from interfering the intake valves 10 and the exhaust valves 11. In this way, good ignition is induced.

Figure 19A:
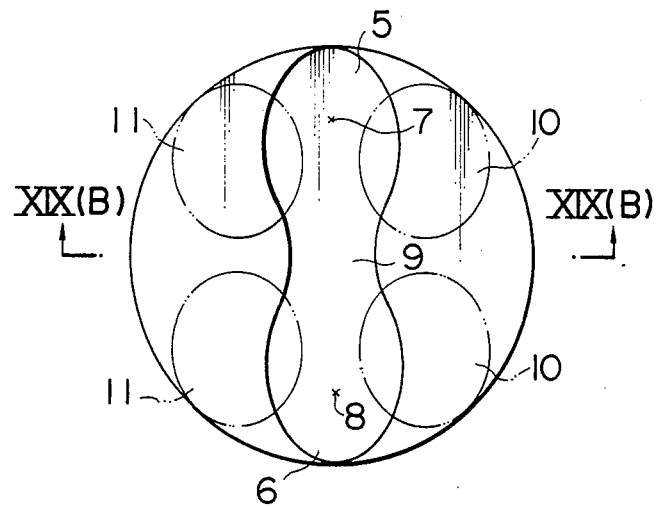
Figure 19B:
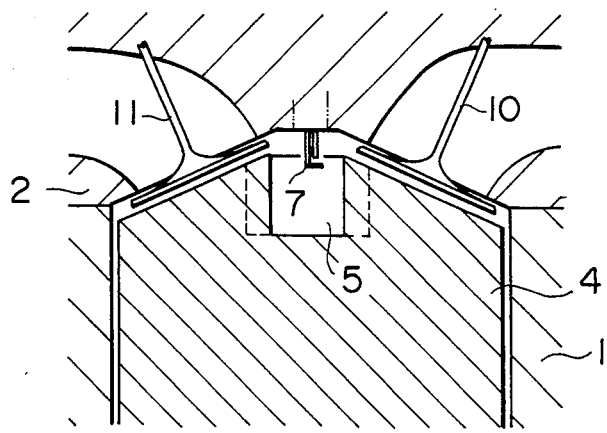

Referring to FIGS. 19(A) and 19(B), cavities 5 and 6 are formed in a spark-ignition engine having a combustion chamber that resembles a pentroof The chamber is provided with two intake valves 10 and two exhaust valve 11. The intake valves 10 and the exhaust valves 11 on the top surface of the chamber are slightly widely spaced from each other to permit spark plugs 7 and 8 to be mounted between them. The cavities 5 and 6 acting as a combustion chamber can extend radially of the chamber. This allows the space to be effectively utilized.

The present invention permits stable combustion of lean air-fuel mixture at high compression ratios without the need for complex control. Thus, the amount of exhaust emission, especially $NO_x$, are greatly reduced. Further, the thermal efficiency can be greatly improved. Obviously, the engine can run stably and easily in the same range of air-fuel ratios as used in the conventional premix engine.

Obviously, numerous modifications and variations of the present invention are possible in light of the above teachings. It is therefore to be understood that within the scope of the appended claims, the invention may be practiced otherwise than as specifically described herein.

What is claimed is:

1. A spark-ignition engine comprising:
   a combustion chamber formed by a cylinder head, a piston and a cylinder block;
   a suction mechanism for supplying sucked air into the combustion chamber through an intake port;
   fuel supply means disposed in said intake port for supplying fuel to the sucked air to form air-fuel mixture;
   a plurality of ignition means for igniting the air-fuel mixture to cause combustion; and
   a plurality of cavities for holding the air-fuel mixture therein, said cavities being formed in at least one of the cylinder head and the piston and being in communication with each other through a communication passage, at least one of said cavities and at least a part of said communication passage being formed in the piston, said at least one cavity and said part of communication passage being composed of side walls and a bottom wall,
   said plurality of ignition means, said cavities and said communication passage being formed within the diameter of said cylinder and
   said plurality of ignition means having ignition portions that face substantially the center of each cavity, thereby igniting the air-fuel mixture within the cavities at plural points.

2. A spark-ignition engine according to claim 1, wherein said spark-ignition engine is a premixing type engine, and said fuel supply means is equipped with a carburetor or a fuel injector for supplying a certain amount of fuel to the sucked air.

3. A spark-ignition engine according to claim 1, wherein said plurality cavities are arranged along the direction of the cyliner diameter.

4. A spark-ignition engine according to claim 1, wherein said plurality of cavities are arranged in a manner to be offset relative to the direction of the cylinder diameter.

* * * * *